United States Patent [19]

Yoshida

[11] 4,308,983

[45] Jan. 5, 1982

[54] CARRIER FOR A MOTOR VEHICLE

[76] Inventor: Minoru Yoshida, 1629 S. La Brea Ave., Apt. #5, Los Angeles, Calif. 90019

[21] Appl. No.: 204,171

[22] Filed: Nov. 5, 1980

Related U.S. Application Data

[63] Continuation-in-part of Ser. No. 50,683, Jun. 21, 1979, abandoned.

[51] Int. Cl.³ .................. B65D 35/00; B62D 37/02
[52] U.S. Cl. .................................. 224/316; 224/309; 296/1 S; 296/217
[58] Field of Search ............ 224/309, 316, 321, 327, 224/328; 296/1 S, 37.1, 37.5, 37.6, 37.7, 100, 217

[56] References Cited

U.S. PATENT DOCUMENTS

| | | | |
|---|---|---|---|
| 2,914,231 | 11/1959 | Hornke | 224/316 |
| 3,330,454 | 7/1967 | Bott | 224/316 |
| 3,514,023 | 5/1970 | Russell et al. | 224/316 |
| 4,087,124 | 5/1978 | Wiley, Jr. | 224/309 X |
| 4,142,759 | 3/1979 | Bienert | 296/217 |
| 4,170,377 | 10/1979 | Ingram | 296/1 S |

FOREIGN PATENT DOCUMENTS 2612954  9/1977  Fed. Rep. of Germany ...... 224/316

Primary Examiner—Steven M. Pollard
Attorney, Agent, or Firm—Koda and Androlia

[57] ABSTRACT

A carrier for a motor vehicle including a planar, curved supporting member which is substantially the same size of the roof of the motor vehicle, a plurality of ribs formed integrally on the undersurface of the supporting member for reinforcing the supporting member and for spacing the supporting member from the roof of the motor vehicle, means for coupling the supporting member to the motor vehicle and a visor movable between an up-position and a down-position. When the visor is on the up-position, wind flow is allowed to pass through the space between the carrier and the roof of the motor vehicle and when the visor is on the down-position, wind flow will be shut-off. Thus, wind flow can be controllable based upon the weather condition.

4 Claims, 6 Drawing Figures

CARRIER FOR A MOTOR VEHICLE

CROSS REFERENCE

This is a continuation-in-part application of Ser. No. 050,683, filed June 21, 1979, now abandoned.

BACKGROUND OF THE INVENTION

1. Field of the Invention

This invention relates to a carrier device for a motor vehicle, and more particularly to a carrier device which is constructed so that wind flow can circulate between the carrier device and the motor vehicle roof top so as to effectively cool the interior of the motor vehicle.

2. Prior Art

In the prior art there exist several types of carrier devices which can be mounted on the roof of a motor vehicle. Typically such carrier devices do not allow for the feature of circulating wind flow between the carrier and the motor vehicle roof top to cool the interior of the car because the carrier device is mounted directly on the roof of the motor vehicle or, in the case wherein the carrier device is separated from the roof of the motor vehicle, supports for the carrier device serve as obstructions to wind flow, thus making such carrier devices ineffective in cooling the interior of a motor vehicle.

Additionally, conventional carrier devices typically are of a container or box-like construction or bar-like structures which extend widthwise across the roof of a motor vehicle. These carrier devices are inadequate because they limit the types of items which can be carried (i.e. a box-like structure cannot carry skis, surfboards, etc. and a bar-like structure cannot carry boxes varying in width and size). Furthermore, these carrier devices are generally unsightly and in the case of the bar-like structure, usually complex and expensive to manufacture.

SUMMARY OF THE INVENTION

Accordingly, it is the general object of the present invention to provide a carrier device which has a sun visor such that wind flow may circulate between the carrier device and the motor vehicle roof top so as to effectively cool the interior of the motor vehicle.

It is another object of the present invention to provide a carrier device for a motor vehicle which can carry a variety of items.

It is still another object of the present invention to provide a carrier device for a motor vehicle which is attractive in appearance.

It is yet another object of the present invention to provide a carrier device which is easy to manufacture and low in cost.

In keeping with the principles of the present invention, the above-mentioned objects are accomplished by the unique design of the carrier device. The carrier device includes a planar curved supporting member which is substantially the same size as the roof of the motor vehicle, a plurality of ribs formed integrally on an undersurface of the supporting member for reinforcing the supporting member and for spacing the supporting member from the roof of the motor vehicle, a means for coupling the supporting member to the motor vehicle and a visor attached to the front of the carrier device which is rotatably movable in a downward or upward position.

BRIEF DESCRIPTION OF THE DRAWINGS

The above-mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
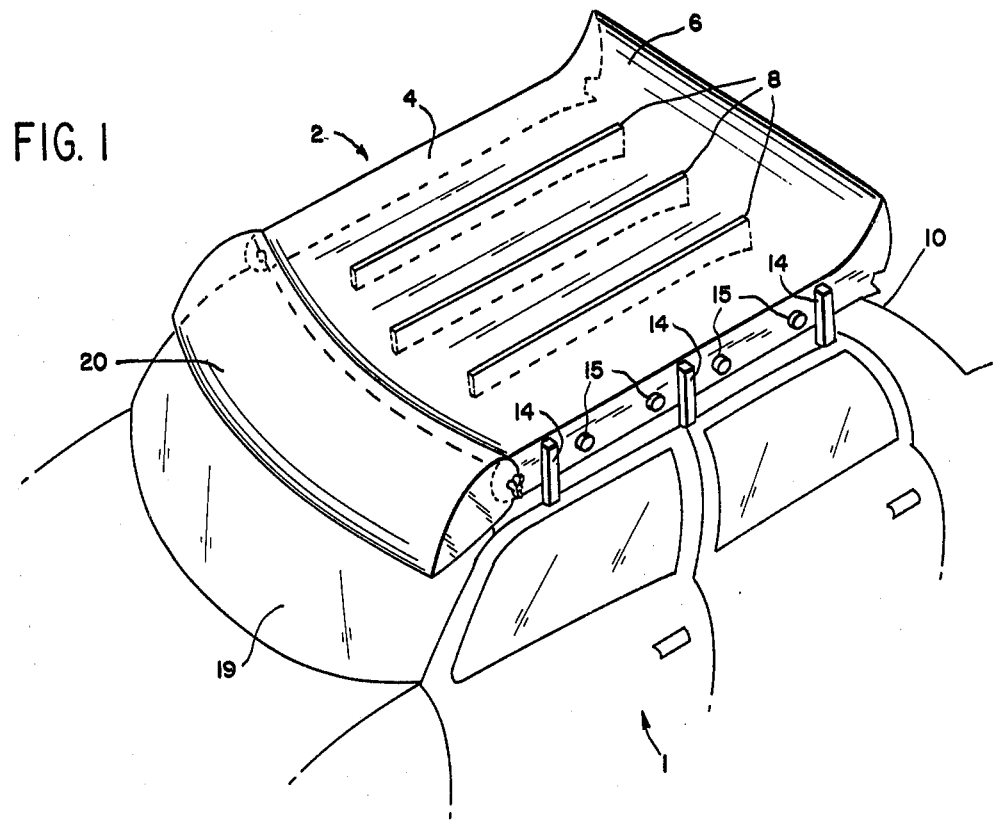
FIG. 1 is a perspective view of a carrier device in accordance with the teachings of the present invention mounted on the roof of a motor vehicle.
Figure 2:
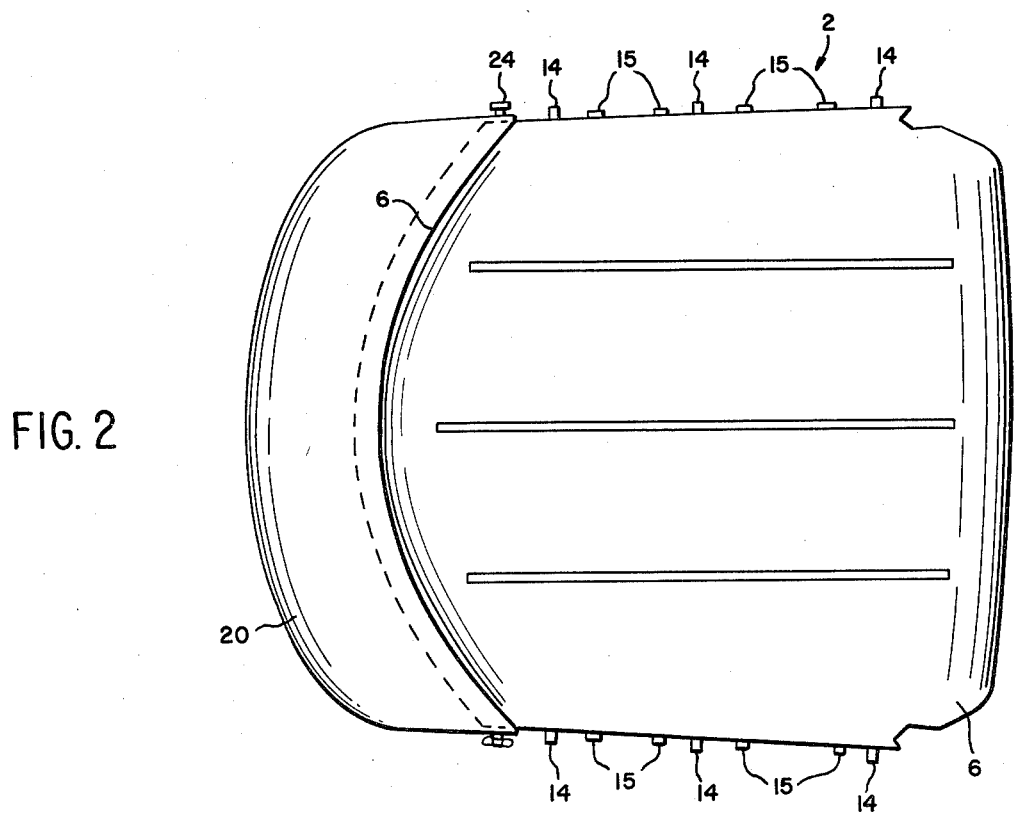
FIG. 2 is a top view of the carrier device of FIG. 1.

Referring more particularly to the drawings, FIGS. 1 and 2 illustrate a carrier device for a motor vehicle in accordance with the teachings of the present invention. In FIGS. 1 and 2, the carrier device 2 includes a planar, curved supporting member 4. The supporting member 4 is generally curved to provide a pleasing appearance and is kicked up in the rear to form a spoiler 6. Ribs 8 are formed integrally on the bottom surface of the supporting member 2 and are for reinforcing the supporting member 4 and for spacing the supporting member 4 from the roof 10 of the motor vehicle. Attached to the front of the carrier device 2 at the front edge 16 is a visor 20 formed of transparent or semi-transparent material. The visor 20 is attached to the carrier device 2 at the front edge 16 by a nut and bolt assembly 24 and an adjustable fastener 23.

Figure 3:
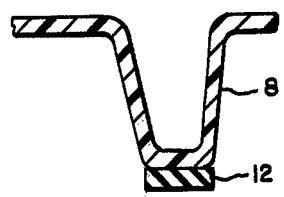
FIG. 3 is a partial cross-sectional view of a rib portion of the carrier device of FIG. 1.

Typically, the supporting member 4 and the ribs 8 can be formed from a plastic in a single mold and the ribs 8 can be of a solid form as shown in FIGS. 1 through 3. It should be apparent, however, that the supporting member 4 together with the ribs 8 could be formed from a single sheet of metal such a aluminium etc.

The ribs 8 sit on the surface 12 of the roof 10 as shown in FIG. 3. A pad (not shown) may be put between the ribs 8 and the surface 12 so that the ribs 8 do not scratch the painted surface 12. Also, clamping means 14 are provided on both sides. Such clamping means are for coupling the supporting member 4 to the roof 10 of the motor vehicle. Typically, the clamping means 14 would comprise a rain gutter clamp.

In operation, the carrier device 2 is installed on the motor vehicle by first placing the carrier device 2 on the roof 10 of the motor vehicle. The clamping means 14 are then coupled to the roof of the motor vehicle and typically connect to the rain gutters of the motor vehicle.

Figure 5A:
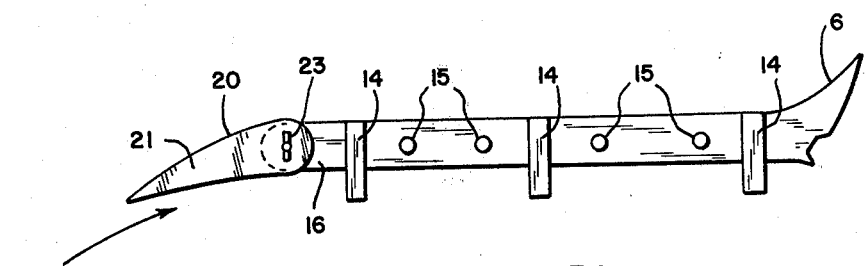
FIG. 5A is a side view of the path of air flow when the visor is in the upward position.
Figure 5B:
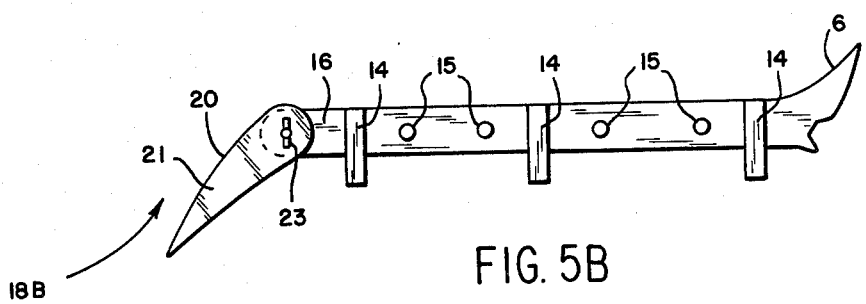
FIG. 5B is a side view of the path of air flow when the visor portion is in the downward position.

Once the carrier device 2 is coupled to the roof 10 of the motor vehicle, the ribs 8 rest on the surface 12 of the roof 10 and space the supporting member 4 away from the roof 10. In addition, along the front edge 16 of the supporting member 4 is formed an open space between the supporting member 4 and the roof 10 of the motor vehicle. This space is maintained by the ribs 8. Therefore, when the vehicle is in forward motion and the visor is adjusted to the upward position (see FIG. 5A) air flow 18 may enter the open space along the front edge 16 and pass between the roof 10 and the undersurface of the supporting member 4 and assist in cooling the interior of the motor vehicle. Additionally, if it is cold or raining and cooling of the interior of the motor vehicle is not necessary, the visor 20 can be adjusted to the downward position (see FIG. 5B) and the air flow 18B will be prevented from circulat underneath the carrier device 2. Furthermore, since the supporting member 4 of the carrier 2 is made from a material which is opaque to infrared rays, the carrier device 2 prevents the heat from the sun from directly heating the roof of the motor vehicle 10 and therefore additionally assists in keeping the interior of the motor vehicle cooler.

Figure 4:
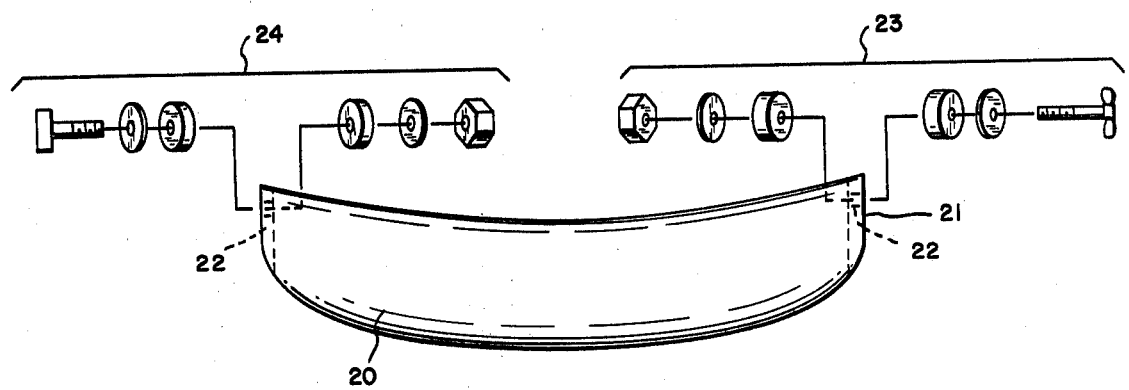
FIG. 4 is a detailed view of the construction of the visor portion of the carrier device of FIG. 1.

In FIG. 4 a detailed view of the visor 20 is illustrated. The visor 20 is attached to the front edge 16 of the carrier device 2 by a nut and bolt assembly 24 and an adjustable fastener 23. By turning the fastener 23 of the visor 20, the visor 20 can be adjusted to an upward or downward position thus permitting air flow (in the upward position) or preventing air flow (in the downward position) to or from circulating between the carrier device 2 and the roof of the motor vehicle 10.

To use the carrier device as a carrier, an object to be carried is placed on the supporting member 4 and ropes or elastic cables are placed over the object to be carried and connected to the tied down hooks 15 which are provided on both sides of the supporting member 4.

From the above description it should be apparent that the carrier device of the present invention features the unique design of an adjustable visor which can permit or prevent air flow to or from circulating between the carrier device and the roof of the motor vehicle.

It should be apparent to those skilled in the art that the above described embodiment is merely illustrative but one of the many possible specific embodiments which represent applications and principles of the present invention. Numerous and varied other arrangements can be readily devised by those skilled in the art without departing from the spirit and scope of the present invention.

I claim:

1. A carrier for a roof of a motor vehicle comprising:
   a planar, curved supporting member which is substantially the same size as the roof of said motor vehicle;
   a plurality of ribs formed integrally and longitudinally on an undersurface of said supporting member for reinforcing the supporting member and for engaging with and for spacing the supporting member from the roof of the motor vehicle;
   means for coupling the supporting member to the motor vehicle; and
   an adjustable visor attached to the front portion of said supporting member, said visor being movable between an up-position and a down-position.

2. A carrier according to claim 1, wherein said visor is connected to said supporting member with a nut and bolt assembly at an end and with an adjustable fastener.

3. A carrier according to claim 2, wherein the position of said visor can be set by adjusting said adjustable fastener.

4. A carrier according to claim 2, wherein said visor has additional connecting units to connect to said supporting member.

* * * * *